(12) United States Patent
Apatachioae

(10) Patent No.: US 12,058,539 B2
(45) Date of Patent: Aug. 6, 2024

(54) DYNAMIC TELECOMMUNICATIONS NETWORK OUTAGE RECOVERY BASED ON PREDICTIVE MODELS

(71) Applicant: T-Mobile USA, Inc., Bellevue, WA (US)

(72) Inventor: George Cristian Apatachioae, Portland, OR (US)

(73) Assignee: T-Mobile USA, Inc., Bellevue, WA (US)

( * ) Notice: Subject to any disclaimer, the term of this patent is extended or adjusted under 35 U.S.C. 154(b) by 400 days.

(21) Appl. No.: 17/576,835

(22) Filed: Jan. 14, 2022

(65) Prior Publication Data
US 2023/0232253 A1 Jul. 20, 2023

(51) Int. Cl.
*H04W 24/00* (2009.01)
*H04B 17/391* (2015.01)
*H04W 24/02* (2009.01)
*H04W 24/04* (2009.01)
*H04W 24/08* (2009.01)
*H04W 28/16* (2009.01)
*H04W 88/08* (2009.01)

(52) U.S. Cl.
CPC ........ *H04W 24/04* (2013.01); *H04B 17/3913* (2015.01); *H04W 24/02* (2013.01); *H04W 28/16* (2013.01)

(58) Field of Classification Search
CPC ..... H04W 24/04; H04W 24/02; H04W 28/16; H04B 17/3913
See application file for complete search history.

(56) References Cited

U.S. PATENT DOCUMENTS

| 6,516,189 | B1 | 2/2003 | Frangione et al. |
| 6,577,616 | B1 | 6/2003 | Chaudry et al. |
| 6,757,268 | B1 | 6/2004 | Zendle |
| 6,907,243 | B1 | 6/2005 | Patel |
| 7,080,144 | B2 | 7/2006 | Boehmke |
| 7,088,997 | B1 | 8/2006 | Boehmke |

(Continued)

FOREIGN PATENT DOCUMENTS

| CN | 1264357 C | 7/2006 |
| CN | 103548378 A | 1/2014 |

(Continued)

*Primary Examiner* — Moustapha Diaby
(74) *Attorney, Agent, or Firm* — Perkins Coie LLP

(57) ABSTRACT

A method for dynamic recovery from an unplanned network outage includes aggregating cell site data of multiple cell sites prior to the unplanned outage. The cell site data include subscriber activity data in site coverage areas of the multiple cell sites and data independent of the subscriber activity data. The method includes obtaining resource information of multiple resources available for recovering from the unplanned network outage and generating a predictive model for recovery from the unplanned network outage based on the cell site data and the resource information. The predictive model includes a priority ranking for recovering the multiple cell sites. The method further includes adjusting the predictive model based on live data indicative of a status of the multiple cell sites during the unplanned network outage. The method includes determining a priority ranking for the multiple cell sites and allocating the available resources for the multiple cell sites accordingly.

20 Claims, 8 Drawing Sheets

(56) References Cited

U.S. PATENT DOCUMENTS

| | | |
|---|---|---|
| 7,236,767 B1 | 6/2007 | Cankaya et al. |
| 7,840,219 B2 | 11/2010 | Ludovico et al. |
| 8,005,510 B2 | 8/2011 | Fischer |
| 8,040,812 B1 | 10/2011 | Mahmood |
| 8,060,145 B2 | 11/2011 | Fischer |
| 8,311,557 B2 | 11/2012 | Annamalai |
| 8,391,826 B2 | 3/2013 | Mckenna et al. |
| 8,452,275 B2 | 5/2013 | Graves et al. |
| 8,489,154 B2 | 7/2013 | Bishop et al. |
| 9,094,899 B2 | 7/2015 | Smith et al. |
| 9,173,106 B2 | 10/2015 | Mahimkar et al. |
| 9,301,167 B2 | 3/2016 | Mahimkar et al. |
| 9,426,727 B2 | 8/2016 | Smith et al. |
| 9,699,671 B1 | 7/2017 | Mueller et al. |
| 9,704,292 B2 | 7/2017 | Priest et al. |
| 9,706,411 B2 | 7/2017 | Goswami et al. |
| 9,736,700 B2 | 8/2017 | Douberley et al. |
| 9,749,882 B2 | 8/2017 | Pelletier |
| 9,826,420 B2 | 11/2017 | Tarraf et al. |
| 9,848,337 B2 | 12/2017 | Puthenpura et al. |
| 9,867,080 B2 | 1/2018 | Sung et al. |
| 9,883,049 B1 | 1/2018 | Warner |
| 9,942,904 B2 | 4/2018 | Smith et al. |
| 10,039,013 B2 | 7/2018 | Periyasamy et al. |
| 10,136,344 B2 | 11/2018 | Pelletier |
| 10,231,147 B2 | 3/2019 | Sung et al. |
| 10,334,164 B2 | 6/2019 | Terry et al. |
| 10,334,488 B2 | 6/2019 | Periyasamy et al. |
| 10,484,889 B2 | 11/2019 | Mueller et al. |
| 10,524,140 B2 | 12/2019 | Pelletier |
| 10,524,158 B2 | 12/2019 | Sung et al. |
| 10,531,309 B1 | 1/2020 | Li et al. |
| 10,644,979 B2 | 5/2020 | Samadi |
| 10,880,754 B1 | 12/2020 | Orbigo et al. |
| 10,979,910 B2 | 4/2021 | Li et al. |
| 11,089,485 B2 | 8/2021 | Wainer et al. |
| 2011/0081897 A1 | 4/2011 | Beattie, Jr. et al. |
| 2011/0090820 A1 | 4/2011 | Hussein et al. |
| 2013/0242736 A1* | 9/2013 | Tarraf ............... H04W 24/02 370/328 |
| 2013/0272132 A1* | 10/2013 | Heo ............... H04W 4/70 370/236.2 |
| 2015/0050925 A1* | 2/2015 | Tapia ............... H04L 41/0816 455/418 |
| 2018/0184414 A1 | 6/2018 | Smith et al. |
| 2020/0186473 A1 | 6/2020 | Serrano Garcia et al. |

FOREIGN PATENT DOCUMENTS

| | | |
|---|---|---|
| CN | 102318256 B | 5/2015 |
| CN | 101938769 B | 9/2015 |
| CN | 102396255 B | 1/2016 |
| CN | 105247931 B | 9/2017 |
| CN | 103796218 B | 10/2018 |
| CN | 104584633 B | 12/2018 |
| CN | 105163337 B | 12/2018 |
| CN | 105357692 B | 12/2018 |
| CN | 109151991 A | 1/2019 |
| CN | 106488518 B | 1/2020 |
| CN | 106792935 B | 7/2020 |
| CN | 109076405 B | 9/2020 |
| CN | 106658479 B | 12/2020 |
| CN | 112188499 A | 1/2021 |
| CN | 106231615 B | 3/2021 |
| CN | 113068198 A | 7/2021 |
| EP | 0990329 A1 | 4/2000 |
| EP | 1244319 A2 | 9/2002 |
| EP | 0746954 B1 | 1/2008 |
| EP | 2403290 B1 | 9/2013 |
| EP | 2692169 A1 | 2/2014 |
| EP | 2813023 A1 | 12/2014 |
| EP | 2883406 A4 | 12/2015 |
| EP | 2868132 A4 | 3/2016 |
| EP | 3005796 A1 | 4/2016 |
| EP | 3167644 A4 | 3/2018 |
| EP | 2441303 B1 | 8/2019 |
| EP | 3366057 B1 | 8/2019 |
| EP | 3662694 A1 | 6/2020 |
| EP | 3005772 B1 | 9/2020 |
| EP | 2449477 B1 | 10/2020 |
| EP | 3755021 A1 | 12/2020 |
| EP | 2888906 B1 | 3/2021 |
| JP | 3630122 B2 | 12/2004 |
| JP | 2013520108 A | 5/2013 |
| JP | 5291182 B2 | 6/2013 |
| JP | 2014509818 A | 4/2014 |
| JP | 6239741 B2 | 11/2017 |
| JP | 2020508596 A | 3/2020 |
| KR | 20010106965 A | 12/2001 |
| KR | 20020062470 A | 7/2002 |
| KR | 101019926 B1 | 3/2011 |
| KR | 20140005311 A | 1/2014 |
| KR | 20160068696 A | 6/2016 |
| KR | 101800786 B1 | 11/2017 |
| KR | 101825538 B1 | 3/2018 |
| KR | 102278362 B1 | 7/2021 |
| WO | 1994003986 | 2/1994 |
| WO | 1994003992 | 2/1994 |
| WO | 1997048191 | 12/1997 |
| WO | 2000076137 | 12/2000 |
| WO | 02071781 A1 | 9/2002 |
| WO | 02078377 A1 | 10/2002 |
| WO | 2004066077 A2 | 8/2004 |
| WO | 2004086795 A3 | 12/2004 |
| WO | 2004109989 A3 | 3/2005 |
| WO | 2005114872 A2 | 12/2005 |
| WO | 2008121053 A1 | 10/2008 |
| WO | 2011002777 A2 | 1/2011 |
| WO | 2010132842 A3 | 2/2011 |
| WO | 2011046705 A1 | 4/2011 |
| WO | 2012027174 A1 | 3/2012 |
| WO | 2011046704 A3 | 8/2012 |
| WO | 2012134865 A1 | 10/2012 |
| WO | 2012159015 A3 | 3/2013 |
| WO | 2013117239 A1 | 8/2013 |
| WO | 2014025296 A1 | 2/2014 |
| WO | 2014031989 A1 | 2/2014 |
| WO | 2014099271 A1 | 6/2014 |
| WO | 2014193840 A1 | 12/2014 |
| WO | 2014191375 A3 | 1/2015 |
| WO | 2015009937 A1 | 1/2015 |
| WO | 2016007473 A1 | 1/2016 |
| WO | 2016016432 A3 | 3/2016 |
| WO | 2016179149 A1 | 11/2016 |
| WO | 2017067618 A1 | 4/2017 |
| WO | 2018090410 A1 | 5/2018 |
| WO | 2018151642 A1 | 8/2018 |
| WO | 2018191038 A1 | 10/2018 |
| WO | 2018202272 A1 | 11/2018 |
| WO | 2019024987 A1 | 2/2019 |
| WO | 2019030464 A1 | 2/2019 |
| WO | 2020074080 A1 | 4/2020 |

* cited by examiner

DYNAMIC TELECOMMUNICATIONS NETWORK OUTAGE RECOVERY BASED ON PREDICTIVE MODELS

BACKGROUND

Voice, data, internet access, and other network services are critical for internal and external communication and data sharing within the society. Network outages affect organizations' as well as individual customers' ability to access, collect and use data, and communicate with each other. Network recovery plans can include sets of procedures for wireless telecommunications network service providers to respond to unplanned outages. The unplanned outages can be caused by natural catastrophes or manmade catastrophes including, for example, hurricanes, earthquakes, snowstorms, floods, tsunamis, wildfires, nuclear power plant malfunctions, cybersecurity incidents and attacks, and terrorist attacks. The goal of network recovery plans is to ensure that all resources and services that rely on the network are back up and running in the event of an outage as soon as possible.

BRIEF DESCRIPTION OF THE DRAWINGS

Detailed descriptions of implementations of the present invention will be described and explained through the use of the accompanying drawings.

Figure 1:
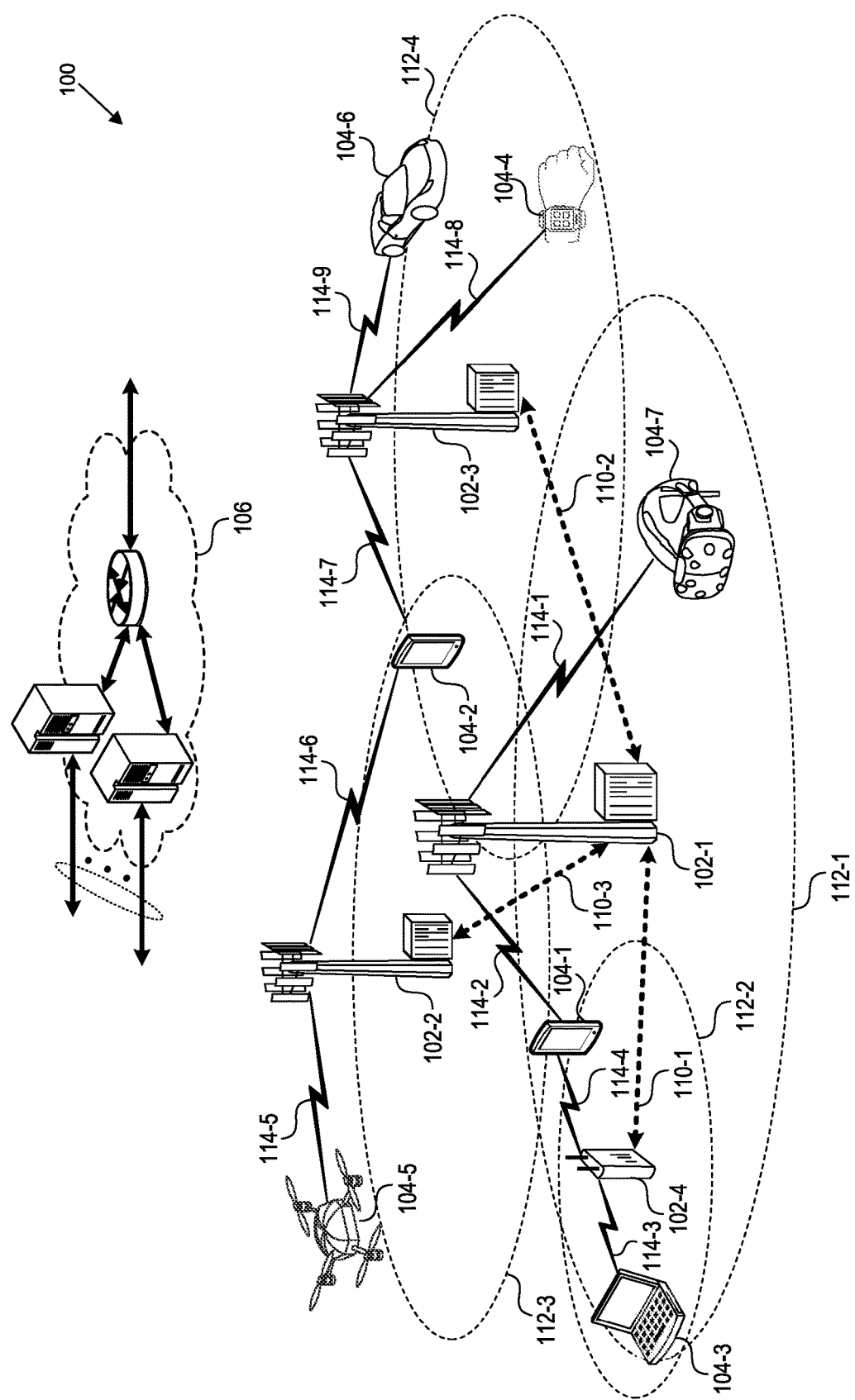
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to methods and systems for generating and dynamically adjusting predictive models that aid in a recovery of a wireless telecommunications network (also referred to as 'network') from an unplanned network outage. The unplanned network outage could be caused by a natural or a manmade catastrophe. A predictive model is generated prior to the unplanned network outage based on data available prior to the unplanned network outage. The predictive model is based on cell site data aggregated prior to the unplanned network outage and the manpower and equipment resources available for recovery from the network outage. The predictive model includes a priority ranking for recovering the multiple cell sites. The predictive model is then dynamically adjusted based on live data during an occurrence of the unplanned outage to enable providing accurate and up-to-date ranking and allocation of the manpower and equipment resources to multiple interrupted cell sites in the network. The adjusting is done based on a variety of information obtained during the outage including, for example, outage statuses of cell sites, reasons for the outage statuses of the cell sites, voice and data key performance indicators (KPIs) at operational cell sites, and/or accessibility to the cell sites during the network outage.

The goal of the dynamic predictive models to aid in the recovery of the wireless telecommunications network from the unplanned network outage is to allocate resources so that locations of high importance are given priority. The high importance locations include, for example, transit centers, airports, harbors, hospitals, shelters, etc. Network recovery plans are especially important for recovery from multi-site outages (e.g., outages affecting more than ten cell sites) that affect a large number of people as well as society's infrastructure. The dynamic predictive models allow generating a cell site recovery ranking list and dispatching resources in the most efficient way to minimize the impact on customers and to support the front-line employees/emergency services (firefighters, police, hospitals, etc.). The method may use historical data from prior outages to notify customers via other means like radio or e-mail (while the network is down) about the expected recovery time and to provide network hardening candidates based on past outages. For example, a cell site that is typically impacted by power outages caused by hurricanes and does not have a generator on-site may benefit greatly from a generator addition.

In one example, a method includes, prior to the unplanned network outage, aggregating cell site data of multiple cell sites of the wireless telecommunication network. The cell site data includes subscriber activity data in cell site coverage areas of the multiple cell sites. The cell site data also include data independent of the subscriber activity data. The method also includes obtaining resource information of multiple resources available for recovering the multiple cell sites. The resources may include equipment as well as human resources. The method includes generating a predictive model for the recovery of the network from the unplanned network outage. The predictive model is generated based on the cell site data and the resource information. The predictive model includes a priority ranking for recovering the multiple cell sites from the unplanned network outage. The predictive model is further dynamically adjusted based on live data captured during the unplanned network outage (e.g., in real-time or near real-time). The method includes capturing the live data which is indicative of the status of the multiple cell sites of the wireless telecommunications network. The method further includes determining, based on the adjusted predictive model, classification and priority ranking for the multiple cell sites and allocating the available resources for the multiple cell sites based on the classification and priority ranking.

In another example, the present disclosure includes a computer system comprising a processor and memory containing instructions that, when executed by the processor, cause the system to generate a predictive model for recovery of the network from the unplanned network outage. The predictive model is generated based on aggregate cell site data of multiple cell sites of a wireless telecommunications network and resource information. The predictive model generates a priority ranking for recovering the multiple cell sites from the unplanned network outage. The computer is caused to aggregate the cell site data that include subscriber activity data in cell site coverage areas of the multiple cell sites and data independent of the subscriber activity data. The computer system is also caused to obtain resource information of multiple resources available for recovering the multiple cell sites from the unplanned network outage.

In yet another example, the present disclosure includes a computer system having a display, a processor, and memory containing instructions that, when executed by the processor, cause the system to generate a predictive model for recovery of the network from the unplanned network outage. The predictive model is generated based on aggregate cell site data of multiple cell sites of a wireless telecommunications network and resource information. The predictive model includes a priority ranking for recovering the multiple cell sites from the unplanned network outage. The computer is caused to aggregate the cell site data that include subscriber activity data in cell site coverage areas of the multiple cell sites and data independent of the subscriber activity data. The computer system is also caused to obtain resource information of multiple resources available for recovering the multiple cell sites from the unplanned network outage. The display of the computer system is further caused to display a graphical user interface (GUI) including a geographical map descriptive of an area affected by the unplanned network outage.

The geographical map includes a first set of icons representing multiple cell sites in the wireless telecommunications network. The geographical map also includes a second set of icons representing important objects in the area affected by the unplanned network and access information (e.g., roads, railroads, or transit center access) for the multiple cell sites in the wireless telecommunications network. The first set of icons representing the multiple cell sites in the network includes a first icon and a second icon. The first icon has a first appearance associated with a first cell site. The second icon has a second appearance different from the first appearance. The second appearance is associated with a second cell site of the multiple cell sites. The first appearance and the second appearance correspond to respective priority rankings of the first cell site and the second cell site in accordance with the predictive model for recovery of the wireless telecommunications network from the unplanned network outage.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. A 5G communication channel can also use other microwaves (e.g., micrometer wave) access frequencies. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Determining Coverage Areas for Network Recovery

An aspect of generating and adjusting predictive models that aid in the recovery of a network including multiple cell sites from an unplanned network outage is to determine locations and coverage areas for each cell site of the multiple cell sites. The determination of the coverage areas of the cell sites is needed for estimating an impact that an interrupted cell site would have on the infrastructure as well as users of the network. The estimated impact is useful for ranking the multiple cell sites in accordance with the urgency of recovery.

Figure 2:
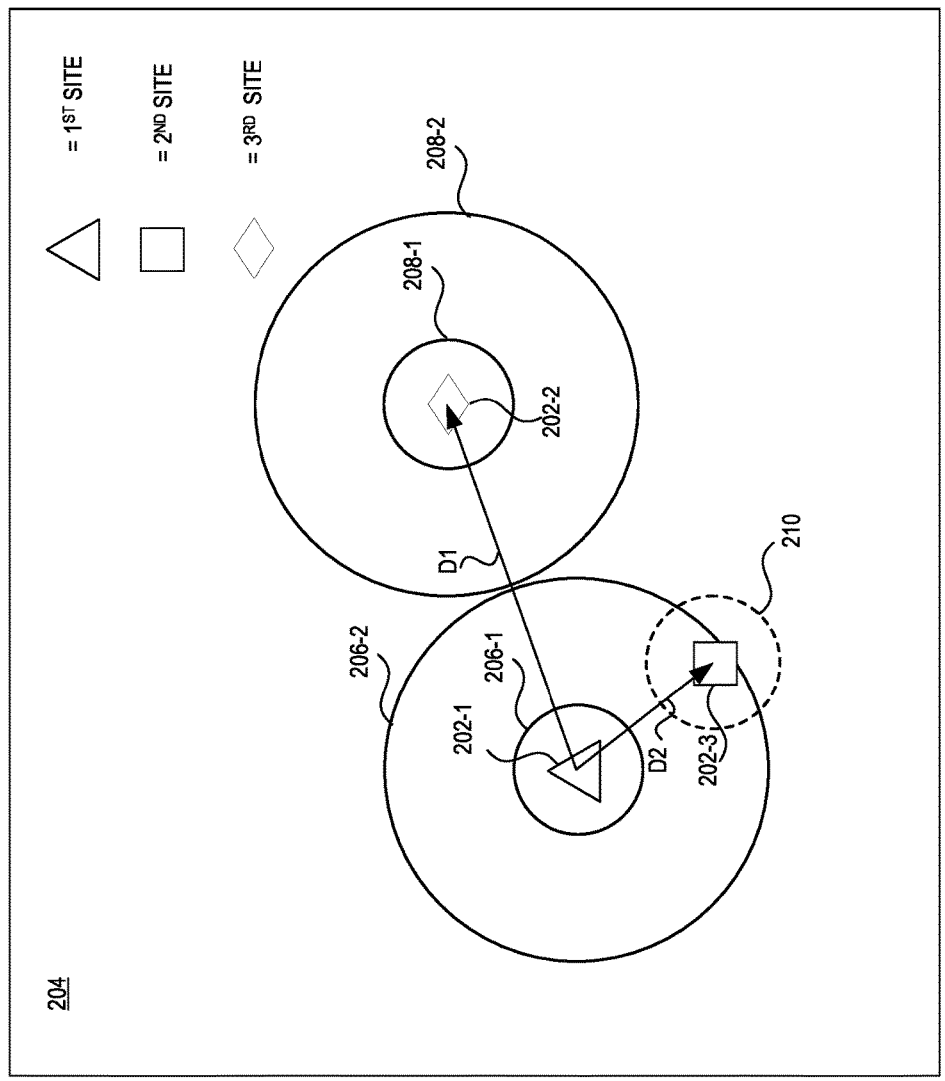
FIG. 2 is a block diagram that illustrates an example of a network including multiple cell sites.

FIG. 2 is a block diagram that illustrates an example of a network 200 including multiple cell sites. As shown, the network 200 includes cell sites 202-1, 202-2, and 202-3 that are distributed over a geographic area 204. In the illustrated example, the relative locations of the cell sites are analyzed to determine how to optimize the recovery of the network 200 in an instance where the operation of one or more of the cell sites 202-1, 202-2, and 202-3 is interrupted during a network outage.

In one implementation, the analysis can involve estimating relative distances between the cell site 202-1, 202-2, and 202-3 (e.g., distances D1 and D2) as well as considering coverage areas of the cell sites 202-1, 202-2, and 202-3. For example, the site 202-1 has an outer radius 206-2 and an inner radius 206-1. The inner radius 206-1 illustrates a border of a primary coverage area (e.g., an area having a strongest network strength), and the outer radius 206-2 illustrates a border of a secondary coverage area (e.g., an area having a network coverage with reduced strength) of cell site 202-1. Similarly, an inner radius 208-1 illustrates a border of a primary coverage area and an outer radius 208-2 illustrates a border of a secondary coverage area of cell site 202-2. A radius 210 corresponds to a border of an overall coverage area of the cell site 202-3. As illustrated, the cell sites 202-1 and 202-2 have significantly larger coverage areas than the cell site 202-3. Furthermore, cell sites 202-1 and 202-2 are separated from each other by the distance D1 so that their coverage areas as distinct from each other (e.g., the primary or secondary coverage areas of cell sites 202-1 and 202-2 do not overlap). In contrast, the cell site 202-3 is separated from the cell site 202-1 by the distance D2 and is located within the outer radius 206-2 of the cell site 202-1. The cell site 202-3 thereby has a coverage area that partially overlaps the secondary coverage area for cell site 202-1. Based on the relative locations and the respective coverage areas, it is likely that cell sites 202-1 and 202-2 would be given a higher priority over the cell site 202-3 for recovering cell sites of the network 200. This is because operational cell site 202-1 can provide partial spatial network coverage (e.g., more than 50%) for the coverage area of cell site 202-3 illustrated by the radius 210. Also, both of the cell sites 202-1 and 202-2 have significantly larger coverage areas than the cell site 202-3. The cell sites 202-1 and 202-2 may further be prioritized over the cell site 202-3 due to the larger size of the coverage areas.

Figure 3A:
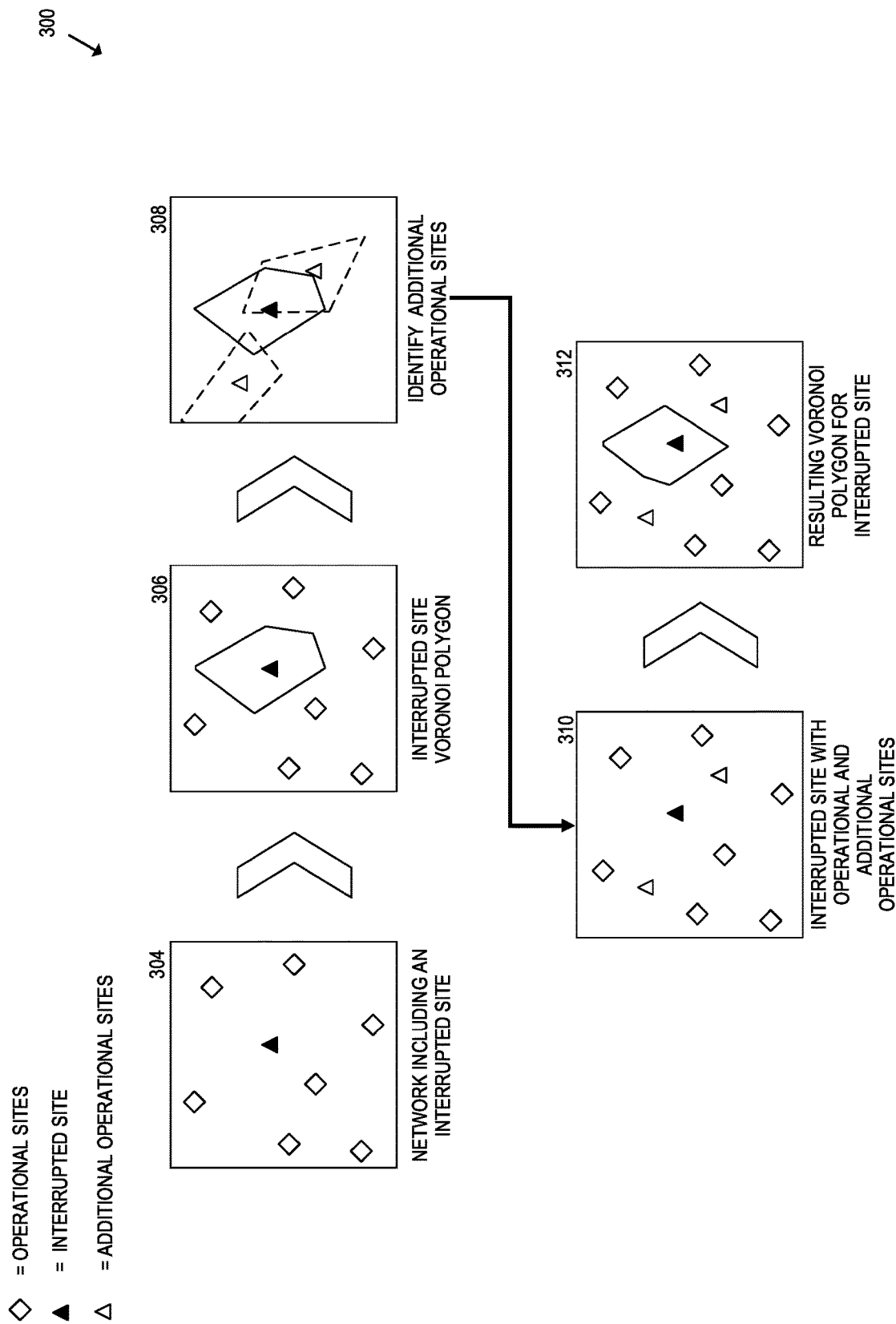
FIG. 3A is a block diagram that illustrates a simulation that forecasts a coverage area loss and recovery of cell sites in a region of interest of a network.

FIG. 3A is a block diagram that illustrates a simulation 300 that forecasts a coverage area loss and recovery of one or more cell sites in a region of interest of a network. The simulation 300 can be performed with a software tool that is implemented on a computer system (e.g., a computer system 700 in FIG. 7). In one example, the tool can receive a request to predict an effect on a service or subscribers in a region of interest of a network (e.g., the network 200 in FIG. 2) caused by a disruption in an operation of one or more sites and recovery sites. For example, the effect can include a loss in network access or a reduction in quality of service to a number of subscribers caused by outage of cell sites in the region of interest. To simulate the effect, the tool obtains cell site information of sites in the region of interest of the network. The cell site information can include relative locations of the cell sites, coverage information including power boundary information, geolocated traffic information, and other information indictive of subscribers that are served by cell sites in the region of interest. The coverage information can be based on an actual coverage experienced by subscribers of the different sites of the network in the region of interest, including steady state coverage and transient coverage at different times. The information is processed to build the prediction model used to forecast an effect and impact of that effect on coverage areas in an instance of an unplanned network outage.

In 304, a simulation of a region of interest in the network includes multiple operational sites (illustrated with white squares) and an interrupted site (illustrated with a black triangle). The simulation 300 represents an existing network during an unplanned outage. In the illustrated example, the network includes multiple cell sites where the tool then merges a site interrupted by the outage with the multiple operational sites. For example, the tool simulates a spatial layout of the operational sites relative to the interrupted site.

In 306, the simulation adds an estimation of a coverage area loss due to the interrupted site in the network relative to the multiple operational sites in the network. The estimated coverage area loss of the interrupted site forms a polygon-shaped coverage area in the spatial layout of the network. In the illustrated example, the polygon-shaped coverage area is a Voronoi polygon. Voronoi polygons can be produced efficiently to generate an accurate representation of each interrupted site's coverage area in the network. Voronoi polygons define individual areas of influence around a set of points whose boundaries define the area that is closest to each point relative to all other points. They are mathematically defined by the perpendicular bisectors of the lines between all points.

In 308, the tool simulates a spatial layout of the interrupted site and recovered sites (illustrated as white triangles). The recovered sites can correspond to sites that were interrupted in 304 but have been recovered prior to recovering the interrupted site illustrated with the black triangle in 304 through 308. The coverage areas of the recovered sites are also estimated as polygon-shaped coverage areas. The simulation can modify the polygon-shaped coverage area of the interrupted site relative to intersections with the polygon-shaped coverage areas of the recovered sites. For example, the simulation can remove portions of the interrupted site's estimated coverage area that overlaps with the estimated coverage areas of the recovered sites. Therefore, the portions that are removed are based on the intersections of the polygon-shaped coverage areas of the cell sites.

In 310, the simulated layout of the network is modified to include the interrupted site and all of the operational sites (i.e., the sites illustrated with white triangles and white squares). In 312, the simulation is modified to show the estimated coverage area of the interrupted site relative to the operational sites and the recovered sites. The estimated coverage area shown in 306 was adjusted in 308 based on the overlap of the coverage areas of the recovered sites.

Thus, the tool can use the predicted coverage to simulate the dynamic effect of an outage in a region of interest caused by multiple interrupted sites and recovery of sites. For example, the tool can estimate a measure indicative of subscriber service degradation in the region of interest covered by the interrupted sites. In another example, the tool can rank the sites based on an approximate service degradation caused by an interruption. The output can include the ranking of the different sites on a display device of a computing device operated by the network planner. For example, the output can include a geographic map such as that shown in FIG. 4.

In some examples, the output can include notifications that indicate risk associated with an outage of a particular site. For example, a "high risk" notification can indicate that an interruption of that particular site would result in a significant amount of service degradation or affected subscribers in the network. A "moderate risk" notification can indicate that an interruption of that particular site would result in a moderately significant amount of service degradation or affected subscribers in the network, which is less than the "high risk" amount. A "low risk" notification can indicate that an interruption of that particular site would result in an amount of service degradation or affected subscribers in the network that is less than the "moderate risk" amount. The high risk, moderate risk, or low risk amount of service degradation or affected subscribers can be determined relative to thresholds that are defined by a user and/or set by the tool.

Figure 3B:
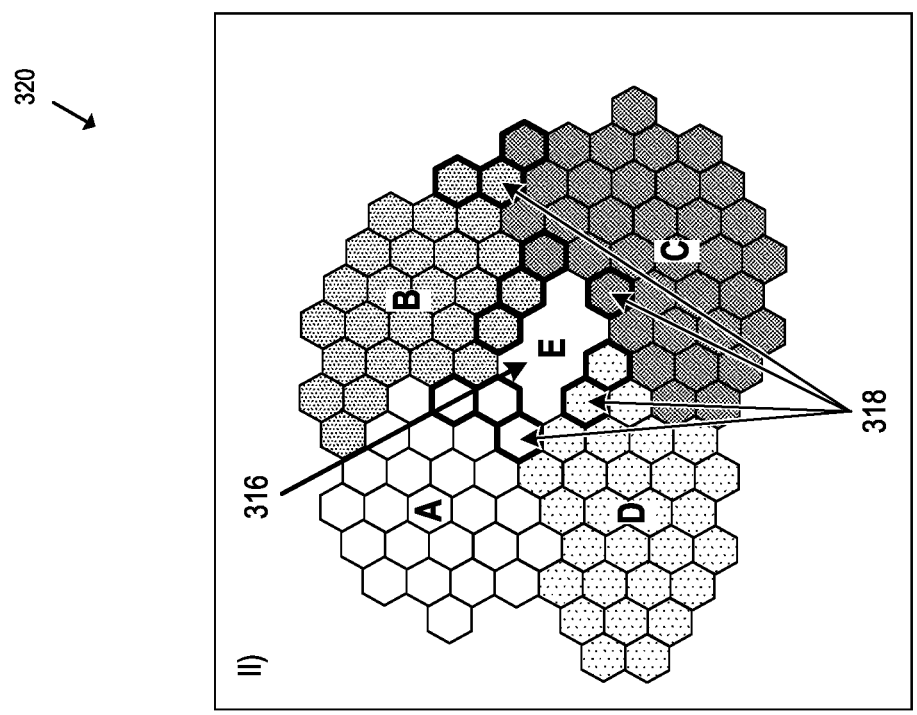
FIG. 3B is a block diagram that illustrates a simulation that forecasts a coverage area loss and recovery of cell sites in a region of interest of a network.
Figure 3B:
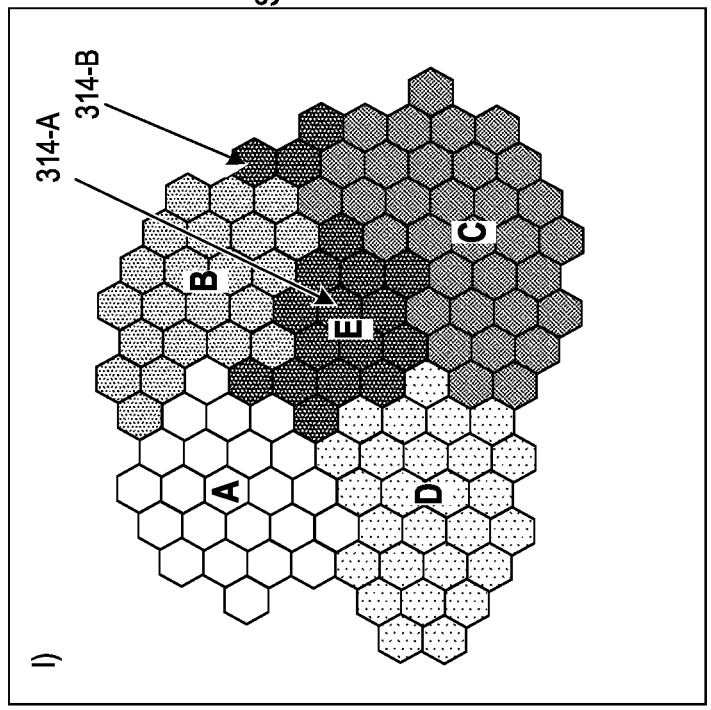

FIG. 3B is a block diagram that illustrates a simulation 320 that forecasts a coverage area loss and recovery cell sites in a region of interest of a network. The simulation 320 may be applied to forecasting the coverage area loss and recovery in an instance of radio frequency (RF) propagation. In particular, the simulation 320 is suitable for predicting the impact of obstacles (e.g., urban, suburban, rural, or forested clutter; terrain; manmade structures) on RF propagation. Due to such obstacles, a server providing the best network for an area may not always be the server located nearest to the area.

The simulation 320 is based on distributing the region of interest of the network into a hexbin map. As shown, the hexbin map includes distribution of a geographical area into multiple hexagonal subregions. An overall impact of an interrupted cell site is estimated by considering the impact on individual hexagonal subregions. In FIG. 3B, the region of interest of the network includes cell sites A through E. Coverage areas for each of the cell sites is indicated with different shadings. In Section I of FIG. 3A, hexagons 314-A and 314-B illustrate the coverage area of the cell site E in an instance where the cell site E is fully operational. For example, the cell site E is the best server in the areas illustrated with the hexagons 314-A and 314-B. It is noted that the coverage of cell site E includes a portion corresponding to the hexagons 314-A and a portion corresponding to the hexagons 314-B that is separate from the portion corresponding to the hexagons 314-A.

In Section II of FIG. 3B, the cell site E has been fully interrupted. However, due to an overlapping network coverage between the coverage areas of site E and sites A, B, C, and D, areas corresponding to hexagons 318 continue to have network coverage even when the cell site E is interrupted. The area impacted by the interruption of the cell site E is, therefore, smaller than the area originally served by the cell site E.

Geographical Map Displaying Results of Dynamic Recovery Models

Figure 4:
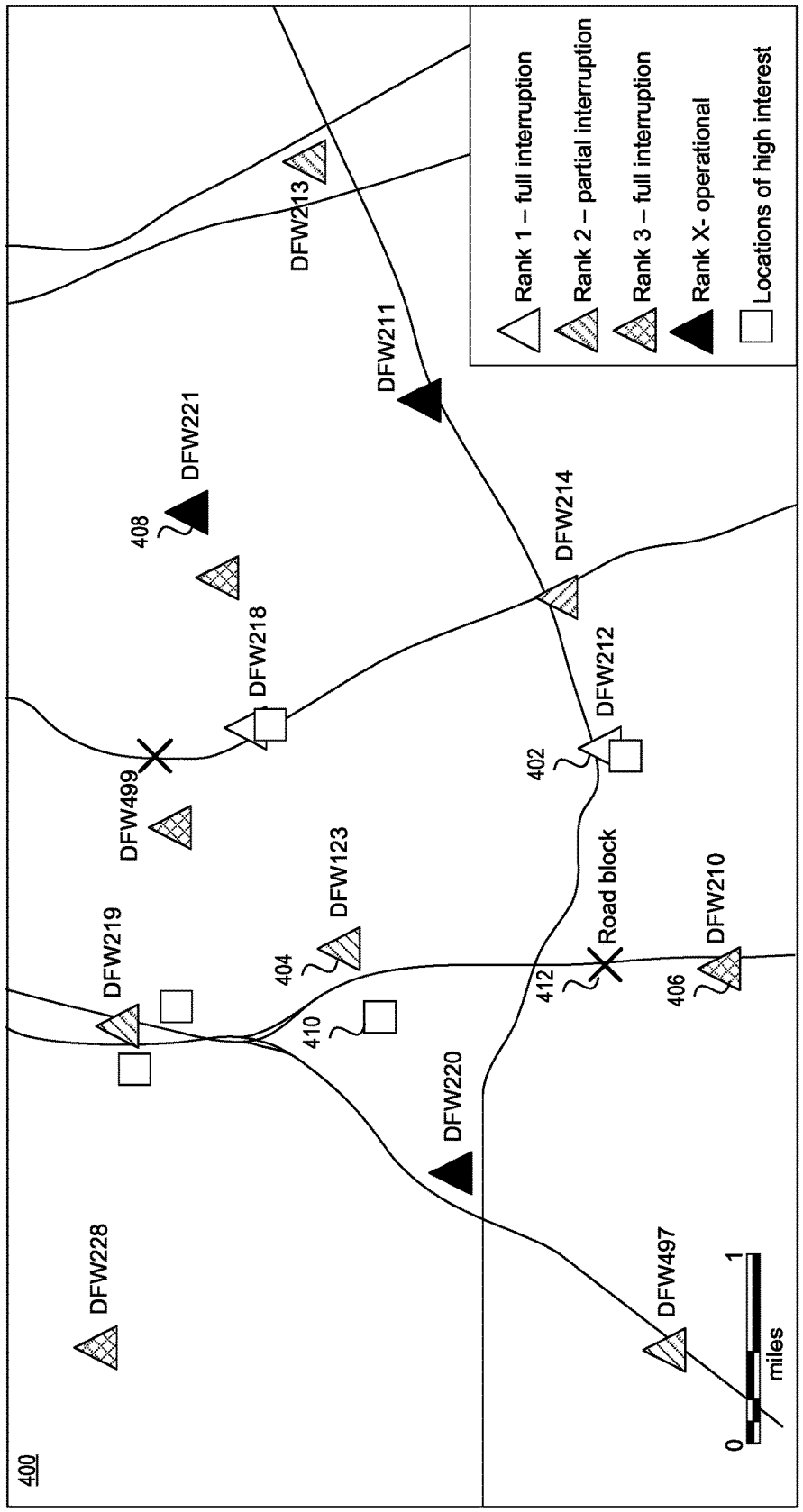
FIG. 4 illustrates a graphical user interface (GUI) including a geographic map descriptive of an area affected by an unplanned network outage.

FIG. 4 illustrates a graphical user interface (GUI) including a geographic map 400 descriptive of an area affected by an unplanned network outage. The map 400 includes classified cell sites and high-importance locations in the affected area. The GUI including the map 400 can be displayed on a display device of a computer system (e.g., a display device 718 of the computer system 700 described with respect to FIG. 7).

Specifically, the map 400 illustrates a location, a classification, and an identification of each cell site relative to other sites. The identification can include an address, global coordinates, or an identification code for each cell site. For example, a cell site 202 is identified with a code 'DFW212'. In FIG. 4, each cell site of the network (illustrated as triangles) is classified as either being fully interrupted, partially interrupted, or operational. A cell site of a network element may have multiple technology layers (e.g., GSM, UMTS/3G, LTE/4G, NR/5G) as well as multiple sectors. An operational cell site may have all its technology layers and sectors operational. A partially interrupted cell site may have some but not all of the technology layers and/or sectors interrupted. For example, a partially interrupted cell site has 25%, 50%, or 75% of its technology layers interrupted. A fully interrupted cell site may have its operations interrupted on all the technology layers as well as all sectors. Each cell site is further ranked in accordance with the importance of the recovery (e.g., Rank 1, Rank 2, Rank 3, etc.). The display also includes a table of legends that identifies the classification statuses. For example, the white triangles (e.g., a cell site 402) correspond to cell sites classified as fully interrupted and ranked as the most urgent cell sites requiring recovery measures. The striped triangles (e.g., a cell site 404) are classified as partially interrupted cell sites. For example, the cell sites operate at 75% capacity, at 50% capacity, or less. The striped triangles further correspond to cell sites ranked as a second most urgent cell sites requiring recovery measured. The crossed triangles (e.g., a cell site 406) are classified as fully interrupted and ranked as a third most urgent cell sites requiring recovery measures. The black triangles (e.g., a cell site 408) are classified as operational cell sites.

The map 400 further includes multiple icons indicative of critical objects (e.g., an object 410 corresponding to a square-shaped icon). The critical objects can include objects that are defined by the user or by a third party (e.g., government officials) as locations having elevated importance. In some implementations, the critical objects include transit centers (e.g., airports, harbors, bus terminals, train stations, or cargo centers) and hospitals or other emergency centers (e.g., police stations or fire stations). The critical objects can also include objects having been assigned with elevated importance during the natural or manmade catastrophe. Such critical objects could include a location assigned as a temporary emergency shelter or as a temporary hospital (e.g., a convention center, a school, or a stadium). Such critical objects can also include a location associated with the catastrophe. For example, a nuclear plant during a nuclear plant malfunctioning or a location critical to be protected to prevent the spread of a wildfire. In some implementations, the critical objects include locations having a high number of network users or network subscribers. Such a location could be, for example, a residential area having a dense population.

The map 400 further includes access information for the cell sites in the network. The access information includes depictions of roads, railroads, waterways, airports or other areas suitable for landing of helicopters or airplanes, other transit centers such as harbors, railway stations, bus terminals, cargo centers, etc. The access information further includes depictions of interruptions in the access ways, such as roadblocks or malfunctions in the operation of the airports or other transit centers. For example, the map 400 includes an X-icon 412 illustrating a roadblock.

The computer system is configured to adjust the map 400 in order to provide accurate and up-to-date information regarding the classifications and/or statuses of the cell sites during the network outage. The adjustments are made in accordance with a prediction model that is adjusted based on live data captured during the network outage. The adjustments include changing the appearance of the icons representing the different cell sites in accordance with an adjusted classification or ranking. For example, in an instance that the live data indicates that the cell site 402 has been fully restored to operation, the classification of the cell site 402 would change from fully interrupted to operational. Accordingly, the appearance of the triangle corresponding to the cell site 402 would change from the white triangle to the black triangle. As another example, in an instance that the government officials announce that the object 410 located in the vicinity of the cell site 404 is assigned to be an emergency shelter, the ranking of the cell site 404 will change from the second most urgent to the most urgent cell site to be recovered. Accordingly, the appearance of the triangle corresponding to the cell site 404 would change from the striped triangle to the white triangle. In FIG. 4, the different cell sites and critical objects are illustrated with triangles and squares having different appearances (e.g., solid fillings or patterned fillings). It is, however, understood that the cell sites and critical objects can be illustrated with icons having any distinguishable features such as shapes, colors, patterns, or symbols (e.g., numbers or letters).

In some implementations, the GUI includes one or more affordances (not shown) enabling user interaction with the GUI. Such affordance could include affordances for providing user input. For example, the user can provide input to manually change the ranking and/or classifications of the cell sites to manage a recovery process. In some implementations, the GUI includes one or more additional display areas for displaying additional information to the user. For example, the GUI can include tables, charts, diagrams, or icons to aid in managing a recovery process.

Generating and Adjusting Predictive Models for Network Recovery

Figure 5:
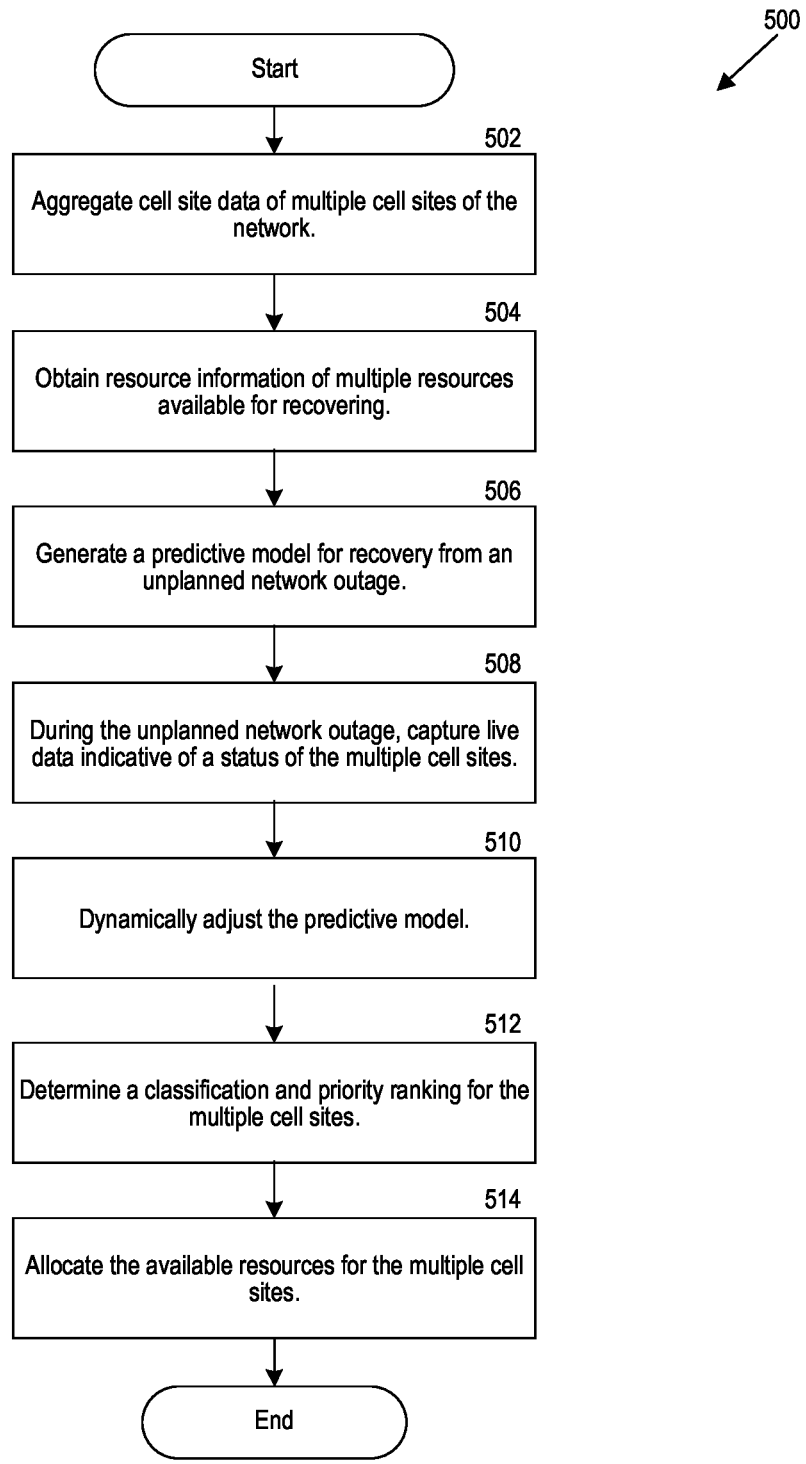
FIG. 5 is a flowchart that illustrates processes for generating and adjusting predictive models for dynamic recovery from an unplanned network outage of a network.

FIG. 5 is a flowchart that illustrates processes 500 for generating and adjusting predictive models for recovery from an unplanned network outage. In particular, the generated predictive models are dynamic so that the models can be adjusted based on live data. The predictive models are useful for recovery from a multi-site network outage including more than 10 interrupted cell sites.

Operations 502 through 506 of the processes 500 are performed prior to an unplanned network outage while operations 508 through 514 are performed during the unplanned network outage. The processes 500 can be performed by a computer and/or telecommunications system ("system"). For example, the processes 500 can be performed by a computer system 700 described below with respect to FIG. 7. The computer system 700 includes a memory (e.g., a memory 706) and a processor (e.g., a processor 702). The memory includes instructions that, when executed by the processor, cause the computer system to perform the processes 500.

At 502, prior to the unplanned network outage, the system aggregates cell site data of multiple cell sites of the network. The cell site data can include subscriber activity data in cell site coverage areas of the multiple cell sites and data independent of the subscriber activity data.

The subscriber activity data can include a number of network users and voice and data KPIs in the coverage areas for the multiple cell sites. In some implementations, aggregating the cell site data includes determining the coverage areas for the multiple cell sites. Determining the coverage areas for the multiple cell sites can include obtaining an identifier and an indication of a geographical location for each of the multiple cell sites. For example, the system determines identifiers and geographic locations for the cell sites 202-1, 202-2, and 202-3 in the network 200 in FIG. 2. Determining the coverage areas can further include determining a predicted primary coverage area for each of the multiple cell sites and determining a predicted secondary coverage area for each of the multiple cell sites. For example, the system determines the primary and secondary coverage areas of the cell site 202-1 defined by the respective inner radius 206-1 and the outer radius 206-2, and the primary and secondary coverage areas of the cell site 202-2 defined by the respective inner radius 208-1 and the outer radius 208-2.

A priority ranking for the multiple cell sites can be generated based on the relative geographic locations of the multiple cell sites, and an overlap between predicted primary coverage areas and/or predicted secondary coverage areas of different cell sites of the multiple cell sites. The priority ranking thereby takes into consideration whether a coverage area of a particular cell site (e.g., the cell site 202-3) overlaps with a primary coverage area or a secondary coverage area of another cell site (e.g., the cell site 202-1). As explained with respect to FIG. 2, since the cell site 202-3 is located within the outer radius 206-2 of the cell site 202-1, the cell site 202-3 has a coverage area that partially overlaps the secondary coverage area of cell site 202-1. Therefore, it is likely that the cell site 202-3 would be given a lower priority ranking because the operational cell site 202-1 can provide a partial network coverage for the coverage area of cell site 202-3 illustrated by the radius 210. In the network 200 shown in FIG. 2, the cell sites 202-1 and 202-2 can receive a higher priority than the cell sites 202-3.

In some implementations, the system determines the coverage areas using the process 300 described with respect to FIG. 3A. The process 300 includes estimating a coverage area for an interrupted site relative to multiple operational sites. The coverage area of the interrupted site forms a polygon-shaped coverage area in the spatial layout of the network, as shown at 306. The coverage area can be modified by recovered sites described with respect to 310. The process 300 can predict the effect of the interrupted site on the network based on the coverage area shape and size. For example, the process 300 can estimate a measure indicative of subscriber service degradation in the area covered by the interrupted sites (e.g., coverage area loss). In some implementations, the system determines the coverage areas using the process 320 described with respect to FIG. 3B. The process 320 includes distributing the region of interest of the network into the hexbin map including multiple hexagonal subregions. The process 320 includes estimating the impact of an interrupted cell site (e.g., the cell site E in FIG. 3B) by evaluating the impact on the individual hexagonal subregions.

In some implementations, the cell site data include a quantity of network users associated with the coverage area of each of the multiple cell sites. Aggregating the quantity of network users can include retrieving a quantity of network subscribers associated with each of the multiple cell sites either as part of their subscription plans or based on monitored utilization of network resources. For example, the quantity of network subscribers is retrieved from an up-to-date customer information database. Aggregating the quantity of network users can also include retrieving an estimated number of network users associated with each network subscriber plan associated with each of the multiple cell sites. For example, a family of four is sharing a single network subscription plan or a student body on a college campus is sharing network resources in a common region (coverage area(s)) associated with the college.

Retrieving the estimated number of the network users can include retrieving the latest census data of a residential area and/or retrieving population data from particular organizations that provide a shared network. For example, an educational facility provides a shared network to students and teachers, a company provides a shared network to its employees, and a residential housing complex provides a shared network to its renters, etc. The quantity of the network users can then be calculated based on the quantity of network subscribers and the estimated number of network users associated with each network subscriber. For example, the quantity of the network users can be calculated by multiplying the quantity of subscribers with an estimated average number of network user per a subscriber. As another example, the quantity of the network users is calculated by adding the estimated number of network users for each individual subscriber in the network.

In some implementations, the subscriber activity data in the cell site coverage areas include voice and data KPIs. Aggregating the voice and data KPIs can include collecting radio access network (RAN) KPIs data and location session record (LSR) data associated with a respective area of the network. For example, the RAN KPIs and LSR data are collected over a period of time (e.g., an hour, a day, a week, a month). The system can then estimate the voice and data KPIs in the coverage area of each of the multiple cell sites based on the RAN KPIs data and LSR data.

In some implementations, the cell site data that is independent of the subscriber activity data include one or more indications of critical objects covered by the network (e.g., within coverage areas). The critical objects can include objects that are determined by the user, a network service provider, or by a third party (e.g., the government officers) as locations having elevated importance. The critical objects can include transit centers (e.g., airports, bus terminals, train stations, or cargo centers) and hospitals or other emergency centers (e.g., police stations or fire stations). The critical objects can include an object having been assigned to have an elevated importance during the natural or manmade catastrophe such as a location assigned as an emergency shelter (e.g., a convention center, a school, or a stadium). Furthermore, a critical object could be a location associated with the catastrophe (e.g., a malfunctioning nuclear plant or a location critical to be protected to prevent the spread of a wildfire). In some implementations, the critical objects include locations having a high number of network users or network subscribers determined by the user of the system. Such a location could be, for example, a residential area having a dense population or a population of residents with critical needs for communications.

In some implementations, the data independent of the subscriber activity data include data of vehicular traffic in the cell site coverage areas. Aggregating the data of vehicular traffic can include retrieving Annual Average Daily Traffic (AADT) data. AADT data refers to an average volume of vehicle traffic on a highway or a road per day. The AADT data can be retrieved from, for example, over a computer network from databases of local or national government authorities.

In some implementations, the data independent of the subscriber activity data include data describing accessibility and structural features of each of the multiple cell sites of the network. The accessibility of a cell site can include accessibility of a cell site location by roads, railroad, airway, or waterway. For example, the accessibility describes the possible means of delivering equipment to a particular cell site during a network outage. The structural features data can include a type of the cell site structure, generator availability at the cell site, existing space for generator deployment in case of an emergency, and/or dependencies to other cell sites.

Dependencies to other cell sites, or a capability to generate such dependencies, may include a cell site's ability for communicating on frequency bands requiring line-of-sight (LOS) (e.g., by microwaves). That is, cell sites in a network connect to a core network by means of a communications transport. In many instances, that means of transport include fiber optic transport. In instances where the fiber optic transport is not available (e.g., on a remotely located cell site), the cell site may use microwave transport. For example, a first cell site is indirectly connected to a core network by being connected to a second cell site via microwave transport, and the second cell site is connected to the core network by the fiber optic transport. The cell site connecting to the network via microwave transport requires capabilities to communicate via the microwave transport and being located within LOS of other cell sites that have microwave transport capabilities.

In the occurrence of a network outage, the cell sites having the capabilities for communicating via microwave transport and that are located within LOS of other cell sites with microwave capabilities can generate temporary network communications by using the microwave transport capabilities. Such microwave transport connections can enable faster and efficient recovery of a chain of cell sites by rerouting traffic through a cell site in LOS and with microwave capabilities, and which is connected to a core network (e.g., via fiber or wireless means), to bypass a downed cell site. Therefore, information regarding the capabilities of a cell site to communicate via the microwave transport and being located within LOS of other cell sites can be used by the predictive model for ranking the cell sites.

In some implementations, the aggregated cell site data further includes information about past outages in a particular area or an area similar to the particular area. Such information may include impacted cell sites, challenges faced during the recovery from the past outage, a typical duration of a power or telecommunications company (telco) outage. For example, the information can include information related to recovery from network outages caused by past snowstorms, hurricanes, wildfires, etc.

In some implementations, aggregating the cell site data of the multiple cell sites of the network further includes transforming the aggregated data into hexbins level data. For example, the aggregation includes generating a hexbin map of a geographical area of interest (e.g., the hexbin map illustrated in FIG. 3B) and associating the cell site data at the hexbin level to each of the cell sites on the hexbin map (e.g., the cell sites A through E).

At 504, the system obtains resource information of multiple resources available for recovering the multiple cell sites from the unplanned network outage. The multiple resources available for recovering the multiple cell site from the unplanned network outage can include human resources (i.e., manpower) and equipment resources. The human resources can include, for example, a number of people available during the outage. The resource information can further specify special categories of people available during the outage, such as a number of telecom engineers, a number of electrical engineers, a number of mechanical engineers, a number of firemen, etc. The equipment can include power generators, temporary wireless structures site on wheels (SoW), snow-cats, and/or telco equipment.

At 506, the system generates a predictive model for recovery of the network from the unplanned network outage based on the cell site data and the resource information. The predictive model includes a priority ranking for recovering the multiple cell sites from the unplanned network outage. For example, a cell site having a coverage area that includes multiple critical objects may be assigned a highest priority ranking, a location having a low voice and data KPIs may be given a lowest priority ranking, a residential area having a high network user density may be given a higher priority than a residential area having a low network user density, etc. The priority ranking can include a preemptive ranking of the multiple cell sites based on the multiple resources available for recovering the multiple cell sites from the unplanned network outage. In one example. The preemptive ranking includes all the cell sites in the network and corresponds to an instance where none of the cell sites are interrupted. The preemptive ranking is further generated based on all possible available resources. The preemptive ranking thereby provides a baseline ranking for the multiple cell sites which can then be adjusted with live data including information about the interrupted cell sites and available resources during a network outage.

During the unplanned network outage, at 508 the system captures live data indicative of a status of the multiple cell sites of the network. The live data refers to data that is captured in real time or near real time. The live data indicative of the status of the multiple cell sites of the network can include one or more of: an outage status of a respective cell site in the multiple cell sites, a reason for the outage status of the respective cell site in the multiple cell sites, voice and data KPIs at operational cell sites or dynamic accessibility for the respective cell site in the multiple cell sites.

The outage status of a particular cell site can include the level of interruption. For example, the operation of the particular cell site may be fully interrupted, partially interrupted, or fully operational (e.g., as described with respect to FIG. 4). The reasons for the outage status can include a description of specific challenges at the particular cell site. For example, the outage at the particular cell site could be due to a power outage, physical damages to the structure or hardware of the cell site, or telco interruptions. The dynamic accessibility for the particular cell site in the multiple cell sites can include data describing any available information affecting the accessibility of the respective cell site. For example, the data can describe whether nearby transit centers are operating, whether roads are blocked (e.g., fallen trees blocking the roads), what is the condition of the physical structures at the particular cell site, etc. The data describing accessibility of the respective sites may be obtained from a site survey, from recovery teams assessing the accessibility of the cell sites and damage to the cell sites, or from government agencies.

In some implementations, the system further obtains dynamic information related to extrinsic factors occurring during the unplanned network outage. The extrinsic factors include one or more of a network health status, weather conditions and forecasts, government communications relevant to the unplanned network outage recovery, or service provider communications related to power outages and estimated power recovery times. In some implementations, the dynamic information is added manually. The dynamic information may be received from local officials or a local recovery crew.

In some implementations, dynamic information related to the network health status is retrieved by monitoring the network performance using one or more protocols. Network health monitoring can include monitoring equipment (e.g., servers and wiring), wireless systems, databases, firewalls, network devices, and/or telecommunications associated with the network. The monitoring can include sending periodic requests to servers and measuring the response time, availability, and uptime of the servers to respond. In some implementations, the network health monitoring is performed by network operations centers (NOCs). The monitoring can further include sending notifications to alert the network service provider of possible slowdowns or local outages.

In some implementations, the government communications relevant to the unplanned network outage recovery may include information about infrastructure needs or changes that may affect the particular cell site's ranking. A location may be assigned to be a critical infrastructural center during the network outage and is therefore in high demand of network operations. For example, a location may be assigned to be an emergency shelter, a temporary hospital, a transportation hub, or a temporary camp or a quarter for a recovery crew and is therefore in high need of network operations.

At 510, the system dynamically adjusts the predictive model for recovery of the network based on the live data indicative of the status of the multiple cell sites. The system can further dynamically adjust the predictive model for recovery of the network based on dynamic information related to the extrinsic factors.

At 512, the system determines a classification and priority ranking for the multiple cell sites based on the adjusted predictive model. For example, as shown in FIG. 4, the cell sites can be classified as fully interrupted, partially interrupted, or fully operational. The cell sites are further assessed for their priority for recovery and are categorized accordingly (e.g., Rank 1, Rank 2, Rank 3, etc.).

At 514, the system allocates the available resources for the multiple cell sites based on the classification and priority ranking. The available resources can include human resources as well as equipment, as described above.

In some implementations, the system further generates a dynamic geographical map (e.g., the map 400 in FIG. 4) that depicts a geographic location, the priority ranking, and an identification of each of the multiple cell sites in the network. The geographical map can provide a convenient and efficient way of reviewing and assessing the progress of the recovery from the unplanned network outage. The geographical map can be a useful tool when the user of the system makes strategic decisions related to the recovery efforts.

In some implementations, the system further determines a predictive time until service has been restored at each of the multiple cell sites. For example, the predictive model can indicate that a coverage area corresponding to a particular cell site may have an operational network within the next 2 hours, 12, hours, 24 hours, etc. In some implementations, the system further communicates the predictive time until service has been restored to the network users, news outlets, and/or government agencies.

The dynamic predictive models of the present disclosure are machine learning (ML) and/or artificial intelligent (AI) models. Such models can be of various types, such as Convolutional Neural Networks (CNNs), other types of neural networks (e.g., fully connected), decision trees, forests of classification trees, Support Vector Machines, etc. ML and AI models can be trained to produce particular types of results, operations, etc. A training procedure can include obtaining suitable training items with input associated with a result, applying each training item to the model, and updating model parameters based on comparison of model result to training item result. For example, the ML and/or AI based predictive models of the present disclosure are trained based on the cell site data and the resource information and dynamically adjusted based on the live data indicative of the status of the multiple cell sites during the unplanned network outage.

Figure 6:
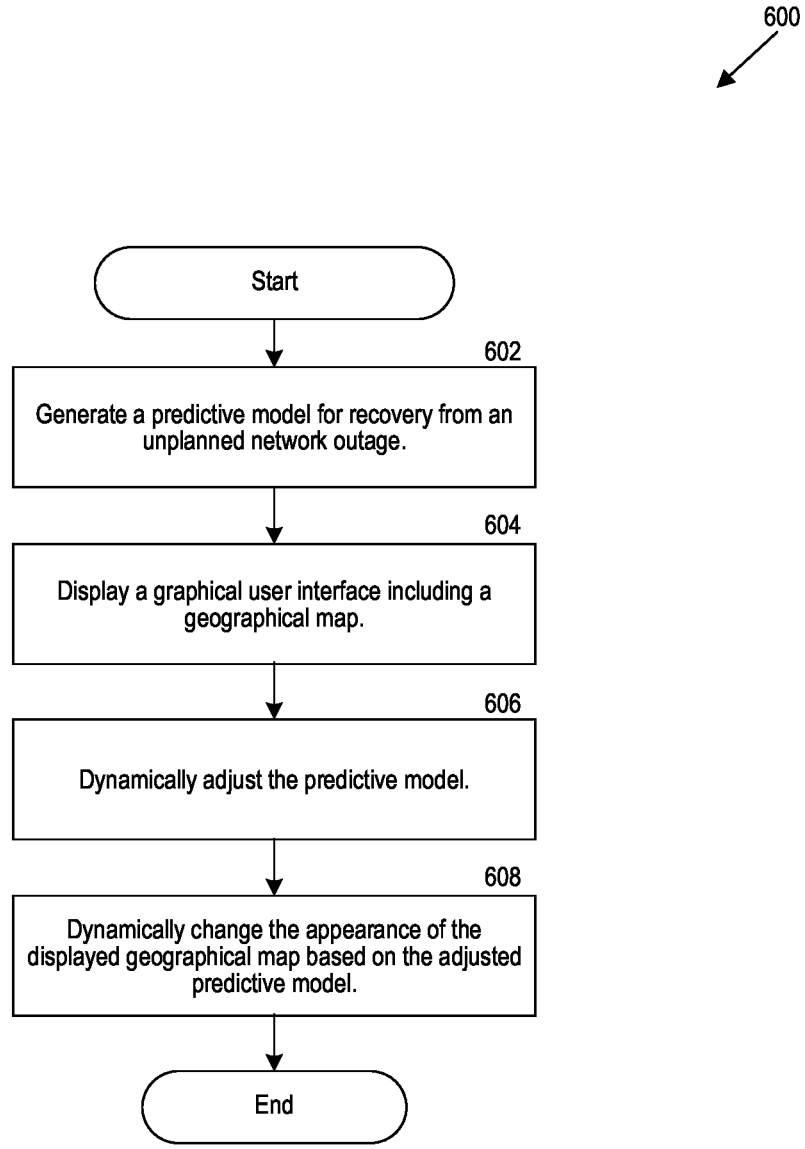
FIG. 6 is a flowchart that illustrates processes for displaying a geographical map depicting recovery from an unplanned network outage of a network based on predictive models.

FIG. 6 is a flowchart that illustrates processes 600 for displaying a geographical map depicting results output based on the predictive models for recovery from an unplanned network outage. The processes 600 can be performed by a computer system. For example, the processes 600 can be performed by the computer system 700 described below with respect to FIG. 7. The computer system 700 includes a memory (e.g., the memory 706), a processor (e.g., the processor 702), and a display (e.g., the display device 718). The memory includes instructions that, when executed by the processor, cause the device to perform the processes 600.

At 602, the system generates the predictive model for recovery of the network from the unplanned network outage based on the cell site data and the resource information, as described with respect to operation 506 in FIG. 5.

At 604, the system displays on a display (e.g., the display device 718) a graphical user interface (GUI) including a geographical map descriptive of an area affected by the unplanned network outage (e.g., the map 400 in FIG. 4). The geographical map includes indications for locations and identifications of the multiple cell sites and the important objects covered by the multiple cell sites. In particular, the map includes a first set of icons representing multiple cell sites in the network (e.g., the triangles), a second set of icons representing important objects in the area affected by the unplanned network (e.g., the squares), and access information for the multiple cell sites in the network (e.g., roads and transit centers). The first set of icons representing the multiple cell sites in the network includes a first icon and a second icon. The first icon has a first appearance associated with a first cell site of the multiple cell sites. The second icon has a second appearance associated with a second cell site of the multiple cell sites. The second appearance is different from the first appearance. The first appearance and the second appearance correspond to respective priority rankings of the first cell site and the second cell site. The ranking is defined in accordance with the predictive model for recovery of the network from the unplanned network outage. For example, the cell site 402 classified as fully interrupted and having the highest priority ranking is represented with the white triangle icon and the cell site 404 classified as partially interrupted and having the second highest priority ranking is represented with the striped triangle icon in the map 400. The appearance can refer to any type of feature that can be used to distinguish icons from each other such as color, shape, pattern, or a symbol.

In some implementations, the geographical map further includes a third set of icons representing interruptions in access ways to the multiple cell sites. For example, the map 400 includes an X-icon 412 illustrating a roadblock.

At 606, the system dynamically adjusts the predictive model for recovery of the network based on the live data indicative of the status of the multiple cell sites, as described with respect to operation 510 in FIG. 5. As such, the predive models are dynamic to forecast recovery of a network outage, and adjust the forecast based on ongoing events or changes.

At 608, the system dynamically changes the appearance of the displayed geographical map based on the adjusted predictive model. In particular, the system dynamically changes the first appearance and the second appearance corresponding to the respective priority rankings of the first cell site and the second cell site in accordance with the adjusted predictive model. The adjusted predictive model includes adjusted classification and priority ranking for the multiple cell sites based on the captured live data indicative of the status of the multiple sites of the network. For example, the appearance of the triangle corresponding to the cell site 402 in the map 400 is changed when the classification or ranking of the cell site 402 changes. For example, in an instance where the operation of the cell site 402 is fully restored the triangle corresponding to the cell site 402 will be changed from the white triangle to the black triangle.

Computer System

Figure 7:
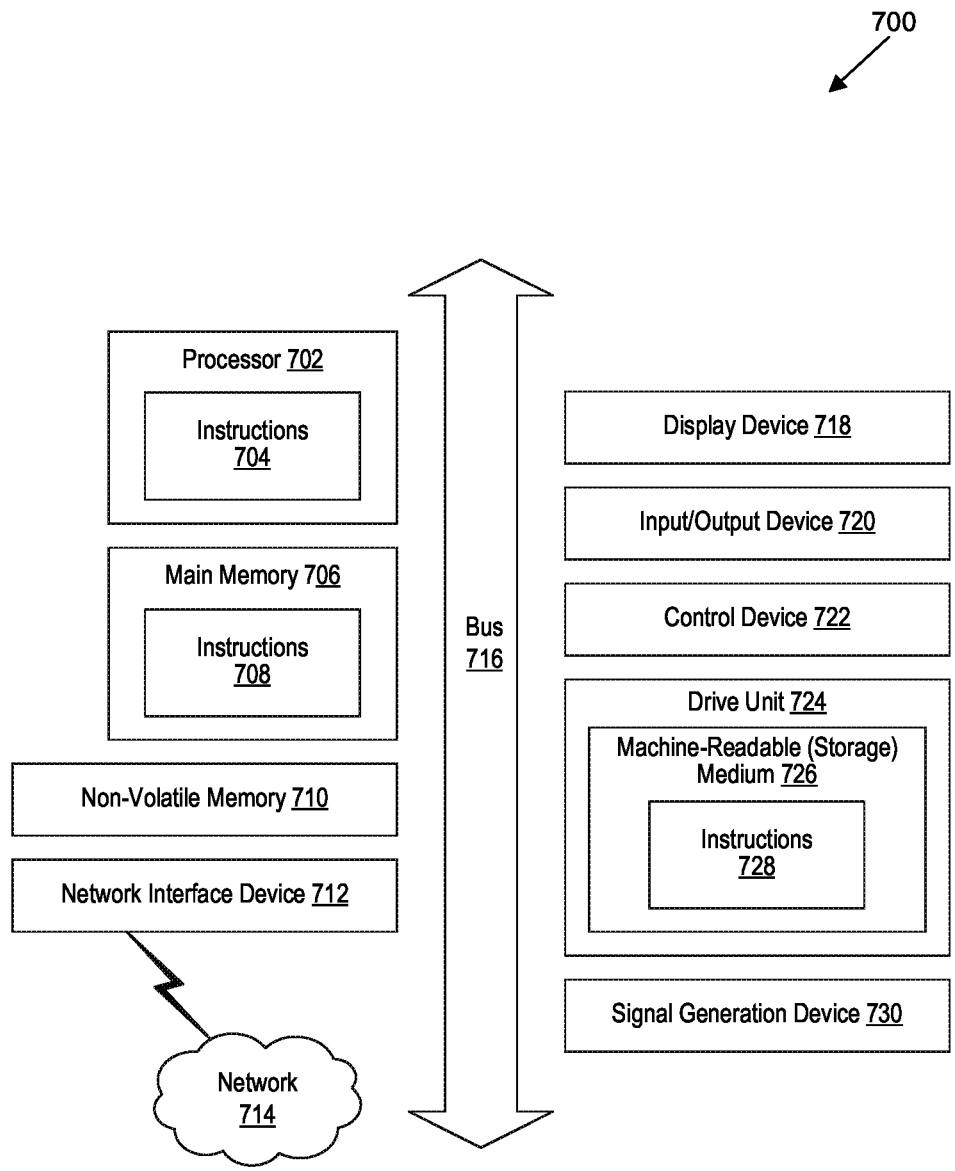
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method for dynamic recovery from an unplanned network outage of a wireless telecommunications network, the method comprising:

prior to the unplanned network outage:

aggregating cell site data of multiple cell sites of the wireless telecommunications network;

wherein the cell site data include subscriber activity data in cell site coverage areas of the multiple cell sites and data independent of the subscriber activity data;

obtaining resource information of multiple resources available for recovering the multiple cell sites from the unplanned network outage; and generating a predictive model for recovery of the wireless telecommunications network from the unplanned network outage based on the cell site data and the resource information, wherein the predictive model includes a priority ranking for recovering the multiple cell sites from the unplanned network outage;

wherein the priority ranking includes a preemptive ranking of the multiple cell sites based on the multiple resources available for recovering the multiple cell sites from the unplanned network outage;

during the unplanned network outage:

capturing live data indicative of a status of the multiple cell sites of the wireless telecommunications network; and dynamically adjusting the predictive model for recovery of the wireless telecommunications network based on the live data indicative of the status of the multiple cell sites;

determining, based on the adjusted predictive model, a classification and priority ranking for the multiple cell sites; and allocating the available resources for the multiple cell sites based on the classification and priority ranking.

2. The method of claim 1, wherein the live data indicative of the status of the multiple cell sites of the wireless telecommunications network include one or more of— an outage status of a respective cell site of the multiple cell sites, a reason for the outage status of the respective cell site of the multiple cell sites, voice and data key performance indicators (KPIs) at operational cell sites, or dynamic accessibility for the respective cell site of the multiple cell sites.

3. The method of claim 1, wherein the live data indicative of the status of the multiple cell sites of the wireless telecommunications include power outage information, wherein the power outage information is provided by a power service provider.

4. The method of claim 1, wherein aggregating the cell site data includes determining the coverage areas for the multiple cell sites comprises:

obtaining an identifier and an indication of a geographical location for each of the multiple cell sites;

determining a predicted primary coverage area for each of the multiple cell sites; and determining a predicted secondary coverage area for each of the multiple cell sites.

5. The method of claim 4, wherein the priority ranking for the multiple cell sites is generated based on relative geographic locations of the multiple cell sites, and an overlap between predicted primary coverage areas or predicted secondary coverage areas of different cell sites of the multiple cell sites.

6. The method of claim 1, wherein the subscriber activity data in the cell site coverage areas include a quantify of network users associated with the coverage area of each of the multiple cell sites, the method further comprising:

retrieving a quantity of network subscribers associated with each of the multiple cell sites, retrieving an estimated number of network users associated with each network subscriber associated with each of the multiple cell sites, and calculating the quantity of the network users based on the quantity of network subscribers and the estimated number of network users associated with each network subscriber.

7. The method of claim 1, wherein the subscriber activity data in the cell site coverage areas include voice and data key performance indicators (KPIs) and aggregating the cell site data of the multiple cell sites of the wireless telecommunications network includes:

collecting radio access network (RAN) KPIs data and location session record (LSR) data associated with a respective area over a period of time;

estimating the voice and data KPIs in the coverage area of each of the multiple cell sites based on the RAN KPIs data and LSR data.

8. The method of claim 1, wherein the data independent of the subscriber activity include one or more indications of critical objects covered by the wireless telecommunications network, the critical objects corresponding to transit centers, hospitals, and/or emergency shelters.

9. The method of claim 1, wherein the data independent of the subscriber activity data include data of vehicular traffic in the cell site coverage areas.

10. The method of claim 1, wherein the data independent of the subscriber activity data include data describing accessibility and structural features of each of the multiple cell sites of the wireless telecommunications network.

11. The method of claim 1, further including:

obtaining, during the unplanned network outage, dynamic information related to extrinsic factors including one or more of— a network health status, weather conditions and forecasts, government communications relevant to the unplanned network outage recover, or service provider communications related to power outages and estimated power recovery times; and dynamically adjusting the predictive model for recovery of the wireless telecommunications network based on the extrinsic factors.

12. The method of claim 1, wherein the multiple resources available for recovering the multiple cell site from the unplanned network outage include human resources and equipment resources.

13. The method of claim 1 further comprising:

generating a dynamic geographical map that depicts a geographic location, the priority ranking and an identification of each of the multiple cell sites in the wireless telecommunications network.

14. The method of claim 1 further comprising:

predicting a time until service is restored at each of the multiple cell sites.

15. A computer system comprising:

a processor; and memory containing instructions that, when executed by the processor, cause the system to:

prior to an unplanned network outage:

aggregate cell site data of multiple cell sites of a wireless telecommunications network;

wherein the cell site data include subscriber activity data in cell site coverage areas of the multiple cell sites and data independent of the subscriber activity data;

obtain resource information of multiple resources available for recovering the multiple cell sites from the unplanned network outage; and generate a predictive model for recovery of the wireless telecommunications network from the unplanned network outage based on the cell site data and the resource information, wherein the predictive model includes a priority ranking for recovering the multiple cell sites from the unplanned network outage.

16. The computer system of claim 15, wherein the computer system if further caused to:

during the unplanned network outage:

capture live data indicative of a status of the multiple cell sites of the wireless telecommunications network;

dynamically adjust the predictive model for recovery of the wireless telecommunications network based on the live data indicative of the status of the multiple cell sites;

determine, based on the adjusted predictive model, a classification and priority ranking for the multiple cell sites; and allocate the available resources for the multiple cell sites based on the classification and priority ranking.

17. A computer system comprising:

a display, a processor; and memory containing instructions that, when executed by the processor, cause the system to:

prior to an unplanned network outage:

aggregate cell site data of multiple cell sites of a wireless telecommunications network;

wherein the cell site data include subscriber activity data in cell site coverage areas of the multiple cell sites and data independent of the subscriber activity data;

obtain resource information of multiple resources available for recovering the multiple cell sites from the unplanned network outage; and generate a predictive model for recovery of the wireless telecommunications network from the unplanned network outage based on the cell site data and the resource information, wherein the predictive model includes a priority ranking for recovering the multiple cell sites from the unplanned network outage, and display, on the display, a graphical user interface including a geographical map descriptive of an area affected by the unplanned network outage, the geographical map including a first set of icons representing multiple cell sites in the wireless telecommunications network, a second set of icons representing important objects in the area affected by the unplanned network, and access information for the multiple cell sites in the wireless telecommunications network;

wherein the first set of icons representing the multiple cell sites in the network includes a first icon having a first appearance associated with a first cell site of the multiple cell sites and a second icon having a second appearance different from the first appearance associated with a second cell site of the multiple cell sites, wherein the first appearance and the second appearance correspond to respective priority rankings of the first cell site and the second cell site in accordance with the predictive model for recovery of the wireless telecommunications network from the unplanned network outage.

18. The computer system of claim 17, wherein the geographical map further includes a third set of icons representing interruptions in access ways to the multiple cell sites.

19. The computer system of claim 17, wherein the computer system is further caused to:

during the unplanned network outage:

dynamically change the first appearance and the second appearance corresponding to the respective priority rankings of the first cell site and the second cell site in accordance with an adjusted predictive model for recovery of the wireless telecommunications network from the unplanned network outage, wherein the adjusted predictive model includes adjusted classification and priority ranking for the multiple cell sites based on captured live data indicative of a status of the multiple sites of the wireless telecommunications network.

20. The computer system of claim 19, wherein the live data indicative of the status of the multiple cell sites of the wireless telecommunications network include one or more of an outage status of a respective cell site in the multiple cell sites, reason for the outage status of the respective cell site in the multiple cell sites, voice and data key performance indicators (KPIs) at operational cell sites, or dynamic accessibility for the respective cell site in multiple cell sites.

* * * * *